(12) United States Patent
van Loon et al.

(10) Patent No.: US 9,247,426 B2
(45) Date of Patent: *Jan. 26, 2016

(54) TELECOMMUNICATIONS NETWORK AND METHOD FOR TIME-BASED NETWORK ACCESS

(71) Applicants: Koninklijke KPN N.V., The Hague (NL); Nederlandse Organisatie voor Toegepast-Natuurwetenschappelijk Onderzoek TNO, Delft (NL)

(72) Inventors: Johannes Maria van Loon, Zoetermeer (NL); Michael Robert Schenk, The Hague (NL)

(73) Assignee: Koninklijke KPN N.V., The Hague (NL)

( * ) Notice: Subject to any disclaimer, the term of this patent is extended or adjusted under 35 U.S.C. 154(b) by 391 days.

This patent is subject to a terminal disclaimer.

(21) Appl. No.: 13/920,563

(22) Filed: Jun. 18, 2013

(65) Prior Publication Data

US 2013/0279332 A1  Oct. 24, 2013

Related U.S. Application Data

(63) Continuation of application No. 12/919,965, filed as application No. PCT/EP2009/001214 on Feb. 19, 2009, now Pat. No. 9,014,667.

(30) Foreign Application Priority Data

Feb. 29, 2008 (EP) .................................. 08003753

(51) Int. Cl.
*H04W 28/02* (2009.01)
*H04W 48/08* (2009.01)
(Continued)

(52) U.S. Cl.
CPC ................ *H04W 12/06* (2013.01); *H04M 3/38* (2013.01); *H04W 4/001* (2013.01); *H04W 4/005* (2013.01);
(Continued)

(58) Field of Classification Search
CPC ..... H04W 4/005; H04W 48/02; H04W 48/06; H04W 12/08; H04W 4/00; H04L 63/108

USPC .................. 455/411, 423, 435.1, 453.2, 454; 370/230, 236, 238, 312, 336, 370/395.2–395.43

See application file for complete search history.

(56) References Cited

U.S. PATENT DOCUMENTS 6,813,496 B2   11/2004  Numminen et al.
(Continued)

FOREIGN PATENT DOCUMENTS

EP   0788287       8/1997
EP   1681815 A1   7/2006
(Continued)

OTHER PUBLICATIONS

"Telecommunications network", Encyclopaedia Britannica, Encyclopaedia Britannica Online. Encyclopaedia Britannica Inc., 2014, Web. Sep. 30, 2014 <http://www.britannica.com/EBchecked/topic/585829/telecommunications-network>.
(Continued)

*Primary Examiner* — Khawar Iqbal
(74) *Attorney, Agent, or Firm* — McDonnell Boehnen Hulbert & Berghoff LLP

(57) ABSTRACT

The invention relates to a telecommunications network configured for providing access to a plurality of terminals is proposed and a method therefore. Each terminal comprises a unique identifier for accessing the telecommunications network. The telecommunications network comprises a register, an access request receiver and an access module. The register is configured for storing the unique identifier of at least one terminal in combination with at least one grant access time interval, or an equivalent thereof, during which access for the terminal is permitted. The access request receiver is configured for receiving the access request and the unique identifier for accessing the telecommunications network from the terminal. The access module is configured for denying access for the terminal if the access request is received outside the time interval, or the equivalent thereof.

37 Claims, 6 Drawing Sheets

(51) Int. Cl.
*H04W 12/06* (2009.01)
*H04M 3/38* (2006.01)
*H04W 4/00* (2009.01)
*H04W 8/26* (2009.01)
*H04W 60/00* (2009.01)
*H04W 74/00* (2009.01)

(52) U.S. Cl.
CPC .......... *H04W 28/0247* (2013.01); *H04W 48/08* (2013.01); *H04W 8/26* (2013.01); *H04W 60/00* (2013.01); *H04W 74/00* (2013.01)

(56) References Cited

U.S. PATENT DOCUMENTS

| | | | |
|---|---|---|---|
| 7,075,890 B2 * | 7/2006 | Ozer | H04W 74/0816 370/230 |
| 7,231,360 B2 | 6/2007 | Sy | |
| 7,447,774 B2 | 11/2008 | Visnawath et al. | |
| 7,505,755 B2 * | 3/2009 | Taniguchi | H04L 12/1417 370/328 |
| 7,774,008 B2 | 8/2010 | Benaouda et al. | |
| 7,821,935 B2 | 10/2010 | Park et al. | |
| 7,995,538 B2 | 8/2011 | Patrick et al. | |
| 8,005,037 B2 * | 8/2011 | Ishii | H04W 28/10 370/235 |
| 8,028,327 B1 | 9/2011 | Talley et al. | |
| 8,064,882 B2 | 11/2011 | Shatzkamer et al. | |
| 8,131,318 B2 | 3/2012 | Montes | |
| 8,189,460 B2 * | 5/2012 | Shaffer | H04L 47/10 370/229 |
| 8,213,953 B1 | 7/2012 | Mangal | |
| 8,380,169 B2 | 2/2013 | Gogic | |
| 9,055,511 B2 | 6/2015 | Gupta et al. | |
| 2002/0086679 A1 | 7/2002 | Li et al. | |
| 2002/0162008 A1 | 10/2002 | Hill | |
| 2002/0180614 A1 | 12/2002 | Gonzalez et al. | |
| 2002/0181501 A1 | 12/2002 | Nova et al. | |
| 2003/0027580 A1 * | 2/2003 | Goodjohn | H04W 84/08 455/453 |
| 2003/0156700 A1 | 8/2003 | Brown et al. | |
| 2004/0088394 A1 | 5/2004 | Brinton et al. | |
| 2004/0147266 A1 | 7/2004 | Hwang et al. | |
| 2004/0162070 A1 | 8/2004 | Baral et al. | |
| 2004/0259528 A1 * | 12/2004 | Gandhi | H04W 48/06 455/411 |
| 2005/0122233 A1 | 6/2005 | Isoyama et al. | |
| 2006/0015354 A1 | 1/2006 | Shrum et al. | |
| 2006/0171350 A1 * | 8/2006 | Taniguchi | H04L 12/1417 370/328 |
| 2006/0294387 A1 | 12/2006 | McCracken et al. | |
| 2007/0142031 A1 | 6/2007 | Lee et al. | |
| 2007/0169107 A1 | 7/2007 | Huttunen | |
| 2007/0195789 A1 | 8/2007 | Yao | |
| 2007/0207812 A1 | 9/2007 | Borran et al. | |
| 2007/0248060 A1 | 10/2007 | Mooney et al. | |
| 2007/0268908 A1 | 11/2007 | Linkola et al. | |
| 2007/0271598 A1 | 11/2007 | Chen et al. | |
| 2008/0075032 A1 | 3/2008 | Balachandran et al. | |
| 2008/0162707 A1 | 7/2008 | Beck et al. | |
| 2008/0207178 A1 | 8/2008 | Tischer et al. | |
| 2009/0141661 A1 | 6/2009 | Li et al. | |
| 2009/0191857 A1 | 7/2009 | Horn et al. | |
| 2009/0191858 A1 | 7/2009 | Calisti et al. | |
| 2010/0014423 A1 * | 1/2010 | Furuskar | H04W 74/02 370/235 |
| 2010/0031334 A1 * | 2/2010 | Shaikh | G06F 21/35 726/7 |
| 2010/0128681 A1 | 5/2010 | Breuer et al. | |
| 2010/0177663 A1 | 7/2010 | Johansson et al. | |
| 2001/0098020 A1 | 4/2011 | Van Loon et al. | |
| 2011/0312308 A1 | 12/2011 | Willey | |
| 2013/0279617 A1 | 10/2013 | Xu et al. | |
| 2013/0304881 A1 * | 11/2013 | Venkatraman | H04L 63/0227 709/220 |

FOREIGN PATENT DOCUMENTS

| | | |
|---|---|---|
| JP | H05-344211 A | 12/1993 |
| JP | H10-117243 A | 5/1998 |
| JP | H11-055176 A | 2/1999 |
| JP | 2004-072367 A | 3/2004 |
| WO | WO99/07167 | 2/1999 |
| WO | WO01/55861 | 8/2001 |
| WO | WO03/028310 | 4/2003 |
| WO | WO2005031544 A2 | 4/2005 |

OTHER PUBLICATIONS

Japanese Office Action in Japanese Patent Application No. 2013-095150, mailed Mar. 27, 2014.
Japanese Office Action in Japanese Patent Application No. 2013-130181, mailed Apr. 23, 2014.
Office Action in U.S. Appl. No. 12/919,965 mailed Jul. 9, 2014.
Office Action in U.S. Appl. No. 12/919,965 mailed Feb. 13, 2013.
ETSI TS 125 331 V5.21.0 (Jan. 2008); Technical Specification; "Universal Mobile Telecommunications System (UMTS); Radio Resource Control (RRC); Protocol Specification (3GPP TS 25.331 version 5.21.0 Release 5)" Jan. 2008.
"Improved Network Load Control for Cell/URA_PCH States", 3GPP TSG-RAN WG2 Meeting #57bis, St. Julian's, Malta, Mar. 26-30, 2007.
Office Action in U.S. Appl. No. 12/919,965 mailed May 15, 2012.
Office Action in U.S. Appl. No. 12/919,965 mailed Feb. 12, 2013.
PCT International Search Report and Written Opinion, PCT International Application No. PCT/EP2009/001214, dated Mar. 23, 2009.
Digital Cellular Telecommunications System (Phase 2+): Universal Mobile Telecommunications System (UMTS); Technical Realization of Operator Determined Barring (ODB) (3GPP TS 23.015 version 7.0.0 Release 7), ETSI TS 123 015, ETSI Standards, Lis, Sophia Antipolis cedex, France, vol. 3-CN2; 3-CN4, No. V7.0.0, Mar. 1, 2007.
European Search Report, European Patent Application No. 08003753.4 dated Aug. 19, 2008.
3rd Generation Partnership Project; Technical Specification Group Services and System Aspects; Study on Facilitating Machine to Machine Communication in 3GPP System; (Release 8), 3GPP Standard; 3GPP TR 22.868, 3rd Generation Partnership Project (3GPP), Mobile Competence Centre; 650, Route Des Lucioles; F-06921 Sophia-Antipolis Cedex; France, No. V8.0.0, Mar. 1, 2007.
GEO-Mobile Radio Interface Specifications (Release 2) General Packet Radio Service; Part 4: Radio interface protocol specifications; Sub-part 8: Mobile Radio Interface Layer 3 Specifications; GMPRS-1 04.008; ETSI TS 101 376-0408 V2.3.1, Aug. 2008, 134 pages.
GEO-Mobile Radio Interface Specifications (Release 2) General Packet Radio Service; Part 3: Network specifications; Sub-part 3: Numbering, addressing and identification; GMPRS-1 03.003; ETSI TS 101 376-03-03 V2.1.1, Mar. 2003, 17 pages.
GEO-Mobile Radio Interface Specifications (Release 2) General Packet Radio Service; Part 4: Radio interface protocol specifications; Sub-part 12: Mobile Earth Station (MES)—Base Station System (BSS) interface; Radio Link Control/Medium Access Control (RLC/MAC) protocol; GMPRS-1 04.060; ETSI TS 101 376-4-12 V2.1.1, Mar. 2003, 94 pages.

* cited by examiner

TELECOMMUNICATIONS NETWORK AND METHOD FOR TIME-BASED NETWORK ACCESS

CROSS REFERENCE TO RELATED APPLICATIONS

The present application is a continuation of, and claims priority to, U.S. application Ser. No. 12/919,965, filed on Aug. 27, 2010, which is a national stage entry of, and claims priority to, PCT/EP2009/001214, filed on Feb. 19, 2009, which claims priority to European Patent Application EP 08003753.4, filed in the European Patent Office on Feb. 29, 2008, all three of which are hereby incorporated in their entirety herein by reference.

FIELD OF THE INVENTION

The invention relates to the field of telecommunications. In particular, the invention relates a telecommunications network and a method of permitting access to said telecommunications network.

BACKGROUND OF THE INVENTION

The past decades have seen an ever increasing demand for data capacity of telecommunications network. Telecommunications providers have adapted their networks to provide extended GSM services, like GPRS, and 3G services and are continuing to provide further services to meet the demands of their clients.

Telecommunications providers have made attempts to influence the behaviour of their clients in order to efficiently use network resources. As an example, mobile data subscriptions nowadays are usually offered using volume based billing, possibly in combination with a volume cap, thereby forcing clients to consider the amount of data to be transmitted over a network. However, the control of the client behaviour and/or terminal data transmission and, therefore, the use of the network resources is still limited.

There is a need in the art for an improved telecommunications network and method for regulating the use of network resources.

SUMMARY OF THE INVENTION

A telecommunications network configured for providing communication access to a plurality of terminals is proposed. Each terminal comprises a unique identifier for accessing the telecommunications network. The unique identifier is preferably associated with a subscription of the terminal, e.g. the identifier of a SIM (IMSI) that is available in the terminal. The telecommunications network comprises a register, an access request receiver and an access module. The register is configured for storing the unique identifier of at least one terminal in combination with at least one grant access time interval, or an equivalent thereof, during which access for the terminal is permitted. The access request receiver is configured for receiving the access request for accessing the telecommunications network from the terminal. The access request may contain the unique identifier or a temporary identifier. The access module is configured for denying access for the terminal if the access request is received outside the access time interval, or the equivalent thereof.

A register and a serving controlling entity for use in such a network are also proposed.

A computer-implemented method of controlling access to a telecommunications network is also proposed. The telecommunications network is configured for allowing access for a plurality of terminals, each terminal comprising a unique identifier for accessing the telecommunications network. The telecommunications network comprises a register configured for storing the unique identifier of at least one terminal in combination with at least one grant access time interval, or an equivalent thereof. An access request is received from the terminal for access to the telecommunications network. The access request may contain the unique identifier or a temporary identifier. In a further step, the grant access time interval for the terminal is verified, using the unique identifier. Access to the telecommunications network for said terminal is denied if the access request is received outside the time interval.

A computer program and a carrier for such a computer program comprising program code portions configured for executing the method are also proposed.

A terminal for use in the system and method is also proposed.

It should be appreciated that an equivalent of the grant access time interval includes a deny access time interval identifying a time interval during which an access request for access to the telecommunications network is to be denied.

The access request may be a circuit-switched access request, a packet-switched access request or a combined request.

The steps of accessing a telecommunications network are standardized in e.g. 3 GGP TS 23.060 (Release 7). It should be appreciated that the access to the telecommunications network can be denied at various access phases. The first phase of requesting network access typically involves a network attach procedure comprising several steps. Preferably, access to the telecommunications network is denied by denying network attach of the terminal. Denying at this phase provides for optimized saving of resources.

A further network access phase involves the establishment of a PDP context. Establishment of the PDP context may be denied. Although the preceding network attach already involved the use of network resources, prohibiting the establishment of a PDP context prevents effective use of the telecommunications network and hence saves resources. It should be noted that operator determined barring (ODB) as such for access to a telecommunications network is already described in 3GGP TS 23.015, V. 7.0.0. The barring possibility allows network operators to deny access to particular destinations for certain subscribers.

By providing the option of specifying one or more time intervals during which access to the telecommunications network is allowed for a particular terminal or group of terminals, the network operator planning and control of the use of network resources is facilitated. Denying or blocking access during time intervals can prove advantageous in various situations. In particular, some machine-to-machine (M2M) applications do not require the transfer of data to be immediate. If these applications are prevented from claiming one or more network resources during e.g. peak load hours, network resources can be saved. Such subscriptions may e.g. be offered at a lower subscription rate.

M2M applications typically involve hundreds or thousands of devices that only rarely require access to a telecommunications network. An example involves the electronic reading of e.g. electricity meters at the homes of a large customer base.

The embodiments of claims 2 and 13 provide for a suitable place in the telecommunications network for making available the combinations of terminal identifier(s) and associated time interval(s).

The embodiments of claims 3 and 14 provide for a dynamic time interval (and possibly a virtual or implicit time interval) during which access to the telecommunications network is allowed/prohibited. These embodiments contribute to the optimum use of network resources.

The embodiments of claims 4 and 15 provide for an improved use of network resources.

The embodiments of claims 5 and 16 provide for an improved use of network resources.

The embodiments of claims 6 and 17 provides the option to inform the terminal of the grant access time interval. Such information should only be transmitted to the terminal in question. Moreover, only allowing single authentication saves network resources and saves power for the terminals.

The embodiments of claims 7 and 18 ensure that the decision whether or not to allow access (either network attach or establishment of the PDP context) to the telecommunications network is embedded at a low level of the telecommunications network, e.g. at the SGSN, reducing network resource consumption. Other solutions, such as the implementation of grant access time rules in a RADIUS server, would require several network functions, mobility management and setting up a packet data protocol (PDP) context, and, thereby, unnecessarily consume network resources in case it would be determined that the terminal accessed the telecommunications network outside the grant access time interval.

The embodiments of claims 8 and 19 allow the transmission of information to the terminal. Such information may include information concerning the applicable grant access time interval. Possibly, the information may include control information for controlling terminal operation. The control information may e.g. control the terminal to log in during a time interval wherein the network load is expected to be low. An authentication procedure is preferably performed for this terminal.

The embodiments of claims 9 and 20 provide for higher level authentication, e.g. at a GGSN, during the grant access time interval.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
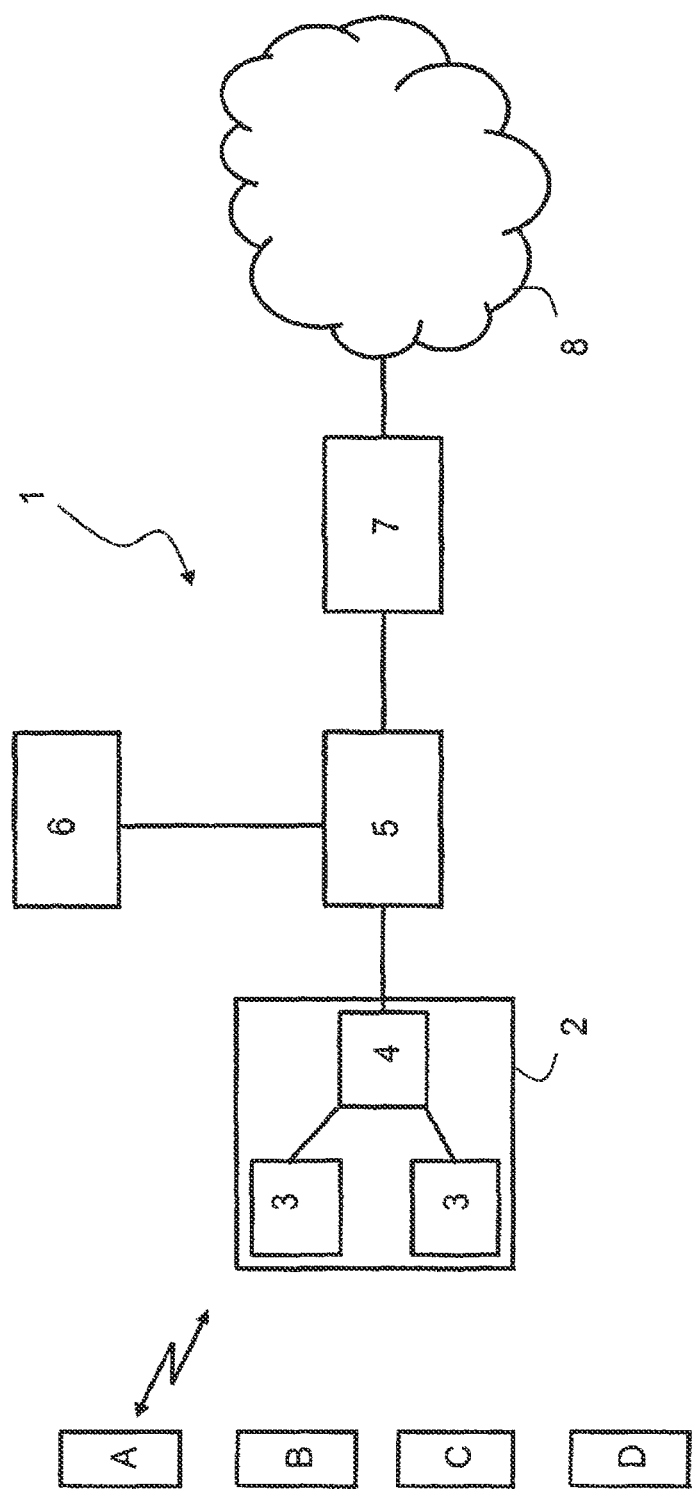
FIG. 1 shows a schematic illustration of a telecommunications network according to an embodiment of the present invention.

FIG. 1 shows a schematic illustration of a packet service telecommunications network 1 in combination with a plurality of terminals A-D that may access the telecommunications network 1 for data communication.

The telecommunications network 1 comprises a radio access network 2 containing a base transceiver station 3 and a base station controller 4. The radio access network is connected to a mobile core network containing a serving controller entity 5, a register 6 and a gateway 7 providing access to a further network 8.

The serving controller entity 5 may be a serving GPRS support node (SGSN) or another entity. The SGSN 5 controls the connection between the telecommunications network 1 and the terminals A-D. It should be appreciated that the telecommunications network may contain a plurality of SGSNs, wherein each of the SGSNs is connected typically to base station controllers 3 in such a way that they can provide a packet service for terminals via several base stations 3.

The register 6 may be a home location register (HLR) or another register (such as a home subscriber server for IMS).

The gateway 7 may be a GPRS gateway support node (GGSN) to e.g. the internet. Other external networks include a corporate network or another network of the operator. The GGSN 7 is connected to the SGSN 5 via a core network.

Access for the terminals A-D to the telecommunications network 1 involves a number of access phases.

The first phase involves the phase during which a terminal A-D performs an attach to the telecommunications network 1. In this phase, various communication steps are performed, including authentication steps, as exemplified in 3GGP TS 23.060 (Release 7). The authentication steps perform a security function and involve exchange of an authentication triplet (for GPRS) or quintet (for UMTS).

In a subsequent phase, a packet data protocol (PDP) context, may be established to carry traffic flows over the telecommunications network 1. A PDP context typically includes a radio access bearer provided between a terminal A and the SGSN 5 and switched packet data channels or tunnels provided between the SGSN 5 and the GGSN 7. A session between the terminal A and another party would then be carried on the established PDP context. A PDP context can carry more than one traffic flow, but all traffic flows within one particular PDP context are treated the same way as regards their transmission across the telecommunications network 1.

In operation, the terminal A may indicate after the network attach phase, in a message requesting to activate the PDP context in the network, an access point name (APN) for selection of a reference point to a certain external network 8. The SGSN 5 may send a PDP context creation request to the GGSN 7 selected e.g. according to the access point name given by the terminal A or to a default GGSN known by the SGSN 5. Subsequently, the PDP context is activated by allocating a PDP context data structure in the SGSN 5 that is used by the terminal A and the GGSN 7 serving the subscribers access point. The data structure contains an IP address of the terminal A, the IMSI of the terminal A and tunnel ID's at both the SGSN 5 and the GGSN 7. The tunnel ID is a number allocated by the GGSN 7 which identifies the data related to a particular PDP context.

Various features can be controlled by the SGSN 5 during a communication session. This control may be based on information associated with the subscription and stored in the HLR 6. The information may be retrieved from the HLR 6 to the SGSN 5 to allow control at the SGSN-level.

Figure 2:
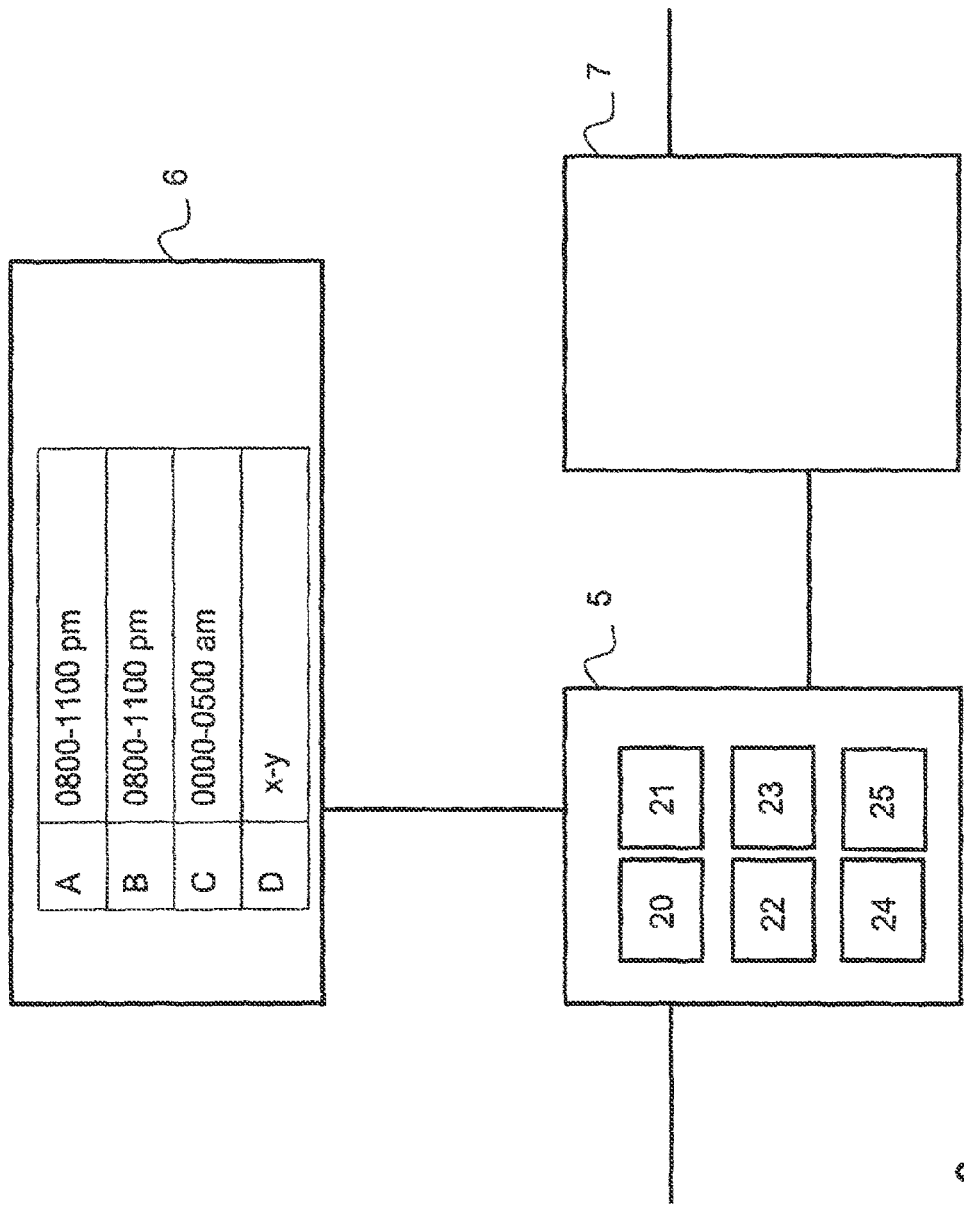
FIG. 2 shows a HLR, a SGSN and a GGSN of the telecommunications network of FIG. 1.

In particular, and with reference now to FIG. 2, the HLR 6 contains a unique identifier associated with the subscription for each terminal A-D, e.g. the IMSI stored in the SIM of the terminal A-D. Each terminal A-D has been assigned a time interval during which access to the telecommunications network 1 will be granted.

In this example, for terminals A and B, access will be granted between 0800-1100 pm. For terminal C, access will be granted between 0000-0500 am. These time intervals are typically off-peak intervals for most days of the year. Batches of terminals may be defined and assigned a particular interval of the off-peak hours. For terminal D, a variable time interval x-y is scheduled, depending on the network load experienced by or expected for the telecommunications network 1. If the network load drops below or is expected to drop below a particular threshold, access is granted to the terminal D.

Of course, the time intervals may also relate to time slots during which access to the telecommunications network 1 is denied, i.e. access deny time intervals. Multiple time intervals may be assigned to a terminal.

In order to control the use of resources of the telecommunications network 1, the SGSN 5 contains several modules for performing the operations described below in further detail. It should be noted that one or more of these modules may be implemented as software modules running on a processor (not shown). The SGSN 5 further contains memory and storage (not shown) for performing these operations in a manner generally known to the skilled person.

The SGSN 5 comprises an access request receiver 20 configured for receiving an access request from the terminals A-D for access to the telecommunications network 1. The access request of a terminal contains the IMSI of the SIM available in this terminal.

The SGSN 5 has an access module 21 configured for denying access for a terminal to the telecommunications network 1 if the access request is received outside the grant access time interval(s) for that terminal (or within the access deny interval). The access denial may relate to the network attach or the establishment of the PDP context.

Moreover, the SGSN 5 comprises a data retrieval module 22. The data retrieval module 22 is configured for retrieving data from the HLR 6, in particular the applicable access grant time interval associated with the terminals A-D from which the access request was received. However, it should be appreciated that the SGSN 5 itself may be pre-configured with respect to particular terminals and therefore already comprise the grant access time interval(s) for these terminals. This may be particularly advantageous for stationary terminals.

The SGSN 5 also comprises a PDP context establishing module 23 and an authenticator 24.

SGSN 5 may also have a network load monitor 25 configured for monitoring the network load of the telecommunications network 1. Network load information may also be obtained from other sources, e.g. other SGSNs or the HLR of the telecommunications network 1. Network monitoring may be real time and/or be based on the expected network load using mathematical models and history data to obtain an appropriate load expectation.

The operation of the telecommunications network 1, and in particular the SGSN 5, will now be described with reference to FIGS. 3A-3D.

Figure 3A:
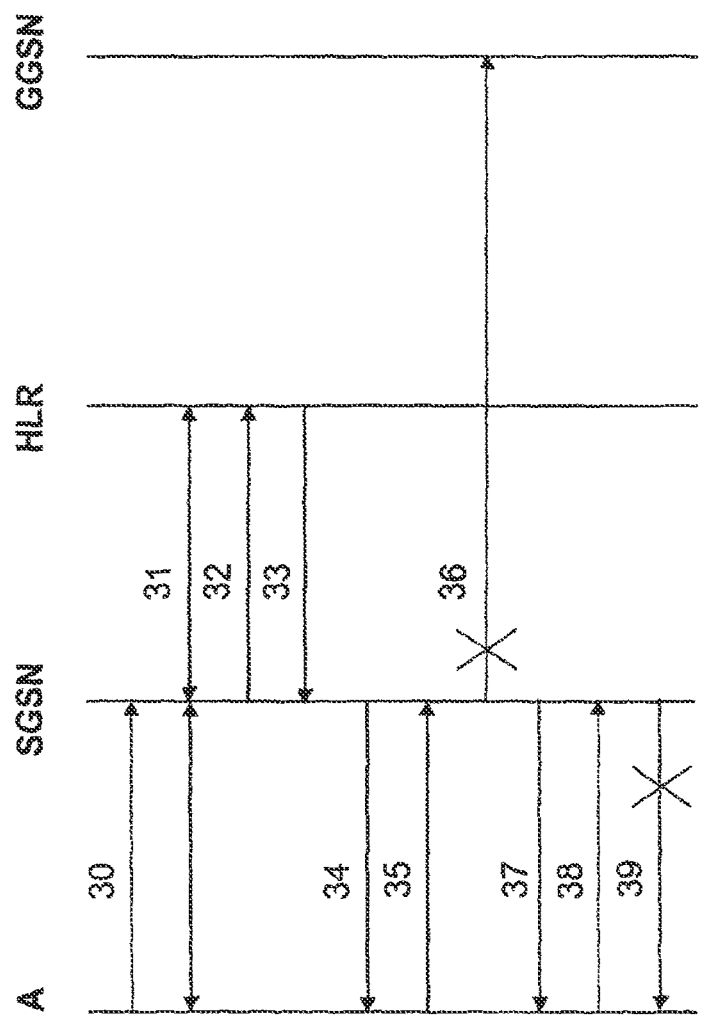
FIGS. 3A-3D show various time diagrams of methods for using the telecommunications system of FIG. 1.

In FIG. 3A, the access request receiver 20 of the SGSN 5 receives an attach request from terminal A at 0700 pm in step 30. To be able to process this attach request, the SGSN needs the IMSI of the SIM available in the terminal. The attach request may contain either this IMSI or a P-TMSI assigned to terminal A by an SGSN. The P-TMSI is used to prevent transmission of the IMSI over the radio path as much as possible for security reasons. If the P-TMSI provided by terminal A is known in the SGSN, the SGSN is able to derive the IMSI. Alternatively, for a P-TMSI provided by terminal A that is not known by the (new) SGSN, the IMSI is provided either by the old SGSN or the terminal itself on request of the new SGSN. The IMSI is used by data retrieval module 22 to retrieve the grant access time interval (0800-1100 pm) from the HLR 6 to the SGSN 5 in step 31.

The grant access time interval may be communicated from the HLR 6 to the SGSN 5 in a variety of ways.

The attach request 30 is typically followed by an authentication check, step 31. The grant access time interval may be transmitted to the SGSN 5 with the authentication triplet or quintet.

The authentication procedure of the network attach phase is typically followed by a location update procedure. First an update location request 32 is transmitted from the SGSN 5 to the HLR 6. The grant access time interval may also be transmitted to the SGSN 5 in a subsequent Insert Subscriber Data message from HLR 6 (step 33). The network attach phase is finalized with an attach accept message to the terminal A (step 34).

After finalizing the network attach phase (which may comprise further steps than mentioned in the previous paragraphs), a PDP context is established. The terminal A requests establishment of the PDP context in an activate PDP context request 35.

Irrespective of the manner of obtaining the grant access time interval, the access module of SGSN 5 determines that the access request was received outside the grant access time interval. Consequently, a PDP context is not established (indicated by the cross in step 36). The terminal A is informed of the denial in step 37.

It is noted that the authenticator 24 of SGSN 5 may or may not have authenticated terminal A in the above situation. Authentication is required if the grant access time interval is transmitted from the HLR 6 to SGSN 5 in response to the update location message 32. However, authentication should not be completed if the grant access time interval is obtained in SGSN with the authentication triplet/quintet. Authentication is preferred if the denial message 37 to the terminal A contains information concerning the grant access time interval.

The SGSN 5 comprises or obtains and maintains the data of the failed access request. This may e.g. be done by storing the time interval in combination with the IMSI of terminal A or by flagging the terminal A temporarily in combination with some time indication.

Another access request at a time outside the window 0800-1100 pm (step 38), again containing or followed by the IMSI of terminal A, may then be denied directly (step 39). Authentication will not be performed again.

Figure 3B:
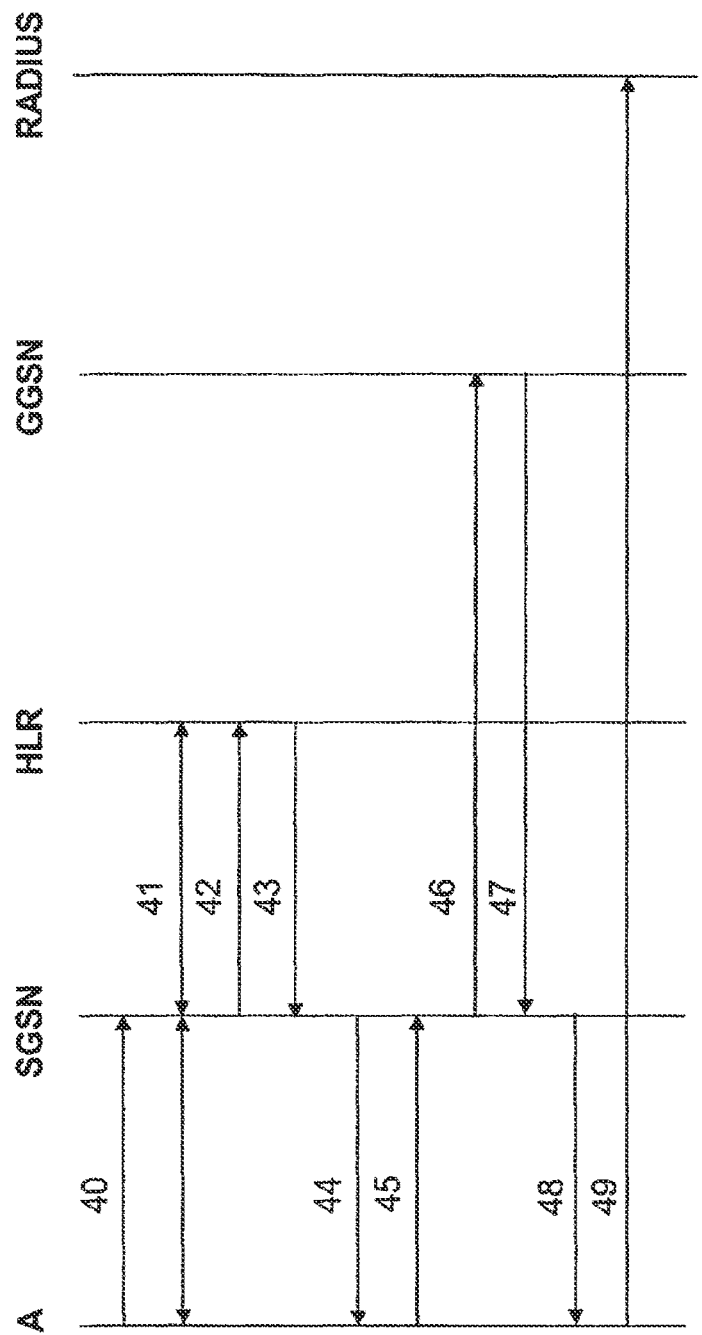

In FIG. 3B, the network attach of terminal A is received at 0900 pm. Steps 40-45 correspond to steps 30-35. Since the network attach request is now within the time interval allocated for access for the terminal A, access module 21 controls the PDP context establishing module 23 of the SGSN 5 to establish a PDP context with the terminal A and to establish a PDP tunnel with the GGSN 7. In particular, step 46 involves a Create PDP Context Request and step 47 a Create PDP Context Response in a manner known as such. In step 48, the terminal A is informed by a Activate PDP Context Accept message. The terminal A may now follow another authentication procedure (step 49), using e.g. a RADIUS server in the further network 8.

The network load monitoring module 25 of SGSN 5 may monitor the network load of (a part of) the telecommunications network 1 or output an expected network load. The network load may be compared with a load threshold in order to evaluate the existence of a low network load situation at a particular time or time interval.

Figure 3C:
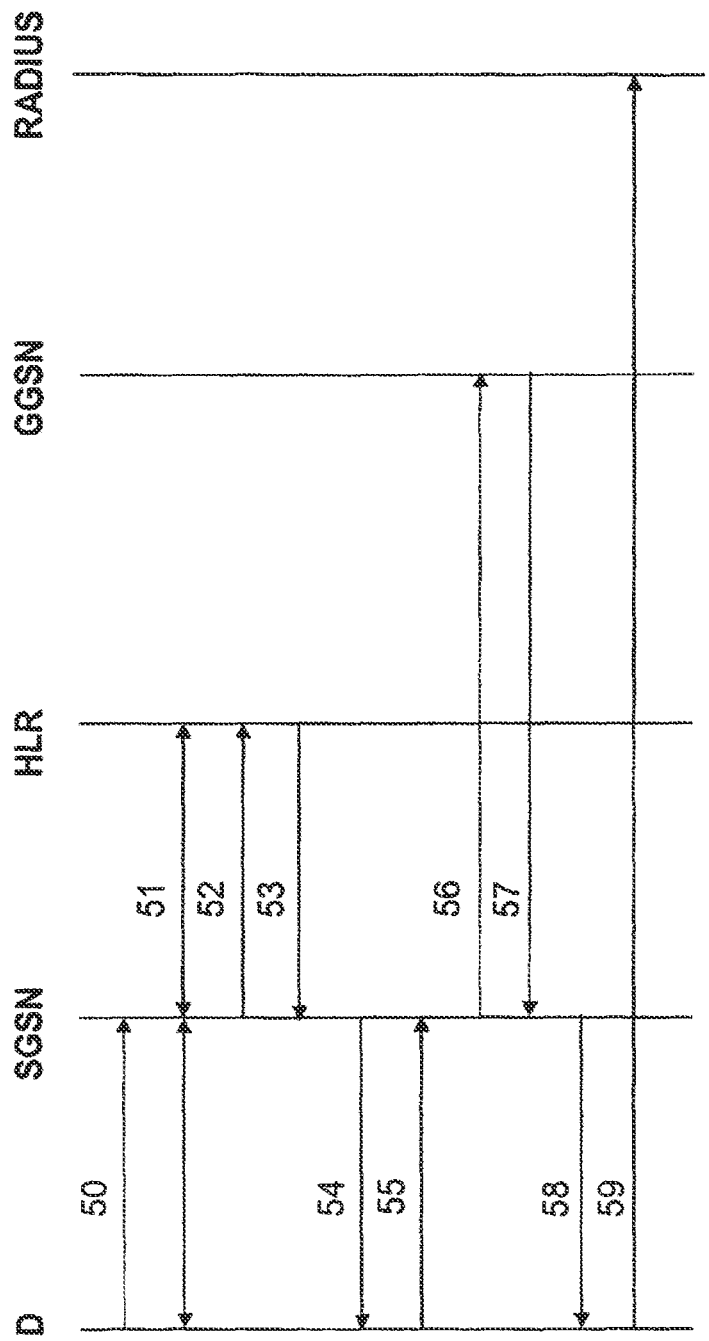

In FIG. 3C, steps 50-53 correspond to steps 30-33 of FIG. 3A. Authentication of terminal D is performed and in step 54, the terminal D is informed of a time interval x-y during which a low network load is expected. The information includes control information to control terminal D such that it accesses the telecommunications network 1 again (step 55) in such a low network load time interval. A PDP context can be set up immediately (steps 56-58) and access to the RADIUS server is allowed.

Figure 3D:
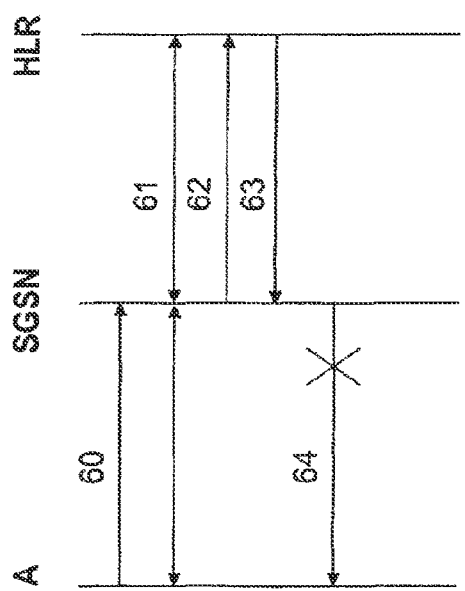

As mentioned above, the denial of access to the telecommunications network 1 is preferably performed during the network attach. FIG. 3D shows in step 60 a network attach message of terminal A containing an IMSI. Then an authentication procedure is performed (step 61) during which the grant access time interval is received at SGSN 5. The grant access time interval and the IMSI is stored at SGSN 5. Alternatively, the grant access time interval is obtained in the location update procedure (steps 62 and 63). The network attach is denied in step 64.

As mentioned before, SGSN 5 may itself comprise pre-configured information regarding the grant access time interval for terminal A. Alternatively, the SGSN uses authenticator 24 to authenticate terminal A and to provide terminal A with information regarding the grant access time interval in step 61.

Figure 4:
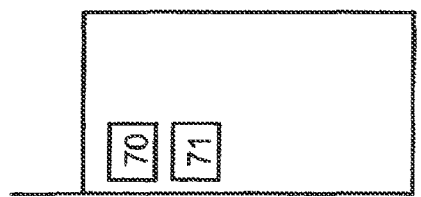
FIG. 4 shows a schematic illustration of a terminal for use with the telecommunications network of FIG. 1.

FIG. 4 shows a schematic illustration of terminal A. The terminal A comprises a transceiver module 70 for communicating with the telecommunications network 1. The terminal A further has an access request module 71. The access request module is configured for receiving information regarding the grant access time interval from the telecommunications network 1 via the transceiver module 70 and to transmit an access request to the telecommunications network only at a time within the grant access time interval.

It should be noted that the above described telecommunications network and system are especially suitable for saving resources. There may be other approaches to influence access behaviour of terminals but these are considered to waste more resources.

As an example, a network provider may allow access to the network at all times but charge a (very) high rate for data sent outside the off-peak time. This provides no incentive for the user to tear down the connection (i.e. the PDP context) to the network. It only provides an incentive to not send data during the expensive peak hour. However, an active PDP context still consumes a lot of resources in the mobile radio and core network as well as requiring an IP address. It also requires the terminal being attached to the network, meaning all kinds of mobility management features should be in place. Furthermore, this solution requires a more complicated billing system that allows charging higher rates at certain times.

Another example would include blocking access to the terminal during peak hours as a rule in a RADIUS server. However, network resources would already be consumed before access is blocked by the RADIUS server. The terminal is already allowed to attach to the network, meaning the SGSN would have retrieved information from the HLR, and is performing mobility management functions. Also, the terminal has been allowed to establish a PDP context. If the RADIUS server would reject the request for access to the external data network, the GGSN would not accept the PDP context, and the tunnel would be taken down. Attachment to the network will however continue if no additional measures were taken.

The invention claimed is:

1. A telecommunications network configured for providing access to a plurality of terminals, each terminal of the plurality comprising a unique identifier for accessing the telecommunications network, wherein the telecommunications network comprises:
    a register configured for storing the unique identifier of at least one terminal in combination with at least one grant access time interval, during which access to the telecommunications network for the at least one terminal is permitted;
    an access request receiver configured for receiving an access request and determining the unique identifier for accessing the telecommunications network from the at least one terminal;
    a serving controller entity configured for reducing network resource consumption;
    one or more processors; and
    memory storing processor instructions that, when executed by the one or more processors, cause the one or more processors to carry out operations including:
    an access operation for denying access to the telecommunications network for the at least one terminal if the access request is received outside of the grant access time interval,
    wherein each terminal operates one or more machine-to-machine applications,
    and wherein the grant access time interval for each terminal is a variable time interval x-y that is scheduled depending on network load experienced by, or expected for, the telecommunications network, access to the telecommunications network being granted to the each terminal if the network load is below, or is expected to be below, a particular threshold.

2. The telecommunications network of claim 1, wherein the serving controller entity is an SGSN.

3. The telecommunications network of claim 1, wherein the access operation further includes denying access to the telecommunications network without authentication of the at least one terminal.

4. The telecommunication network of claim 1, wherein the operations further include an authorization operation for authorizing the at least one terminal in response to receiving the access request, and wherein the access operation further includes denying a network attach upon receiving a further access request from the at least one terminal.

5. The telecommunications network of claim 1, wherein different groups of the terminals are defined,
    wherein a group grant access time interval for the terminals of each group is a predetermined group time interval within an off-peak load interval,
    and wherein the predetermined group time interval is different for different groups.

6. The telecommunications network of claim 1, wherein different groups of the terminals are defined,
    wherein a group grant access time interval for the terminals of each group is a variable time interval x-y that is scheduled depending on network load experienced by, or expected for, the telecommunications network,
    and wherein the group grant access time interval is granted to the terminals if the network load is below, or is expected to be below, a particular threshold.

7. The telecommunications network of claim 1, wherein the telecommunications network is configured for obtaining and for monitoring a network load of the telecommunications network, and wherein the telecommunications network is configured for adapting the grant access time interval based at least in part on the network load.

8. The telecommunications network of claim 1 wherein, a network load of the telecommunications network is monitored by at least one of (i) real-time monitoring, or (ii) monitoring based on an expected network load and using mathematical models and history data.

9. The telecommunications network of claim 1, wherein a class of applications that do not require immediate transfer of data are executed,
and wherein terminals that execute the class of applications are denied access to the telecommunications network during peak load hours by having grant access time intervals that are outside the peak load hours.

10. The telecommunications network of claim 9, wherein the terminals that execute the class of applications have one or more grant access time intervals that are assigned to a group of terminals made up of at least a particular terminal.

11. The telecommunications network of claim 1, wherein the telecommunications network comprises a cellular network, and the register is one of a home location register or a home subscriber server of the cellular telecommunications network.

12. The telecommunications network of claim 1, further comprising a network load monitor configured for monitoring a network load of the telecommunications network.

13. The telecommunications network of claim 1, wherein the serving controller entity comprises the access request receiver,
wherein the serving controller entity further comprises a data retrieval module configured for retrieving the grant access time interval from the register in response to receiving the access request,
and wherein the access operation further includes denying a network attach to the telecommunications network or denying establishing a packet data protocol context in the telecommunications network with the at least one terminal if the access request is received outside the retrieved grant access time interval.

14. The telecommunications network of claim 1, wherein the serving controller entity is configured for transmitting access denial information to the at least one terminal in response to the access operation denying access to the telecommunications network for the at least one terminal.

15. The telecommunications network of claim 1, wherein the network further comprises a gateway to a further network, the gateway being configured for allowing further authentication of the at least one terminal.

16. A register configured for use in a telecommunications network, wherein the telecommunications network is configured for providing access to a plurality of terminals, each terminal of the plurality comprising a unique identifier for accessing the telecommunications network,
and wherein the register is further configured to store the unique identifier of at least one terminal in combination with at least one grant access time interval, during which access to the telecommunications network for the at least one terminal is permitted,
wherein each terminal operates one or more machine-to-machine applications,
and wherein the grant access time interval for each terminal is a variable time interval x-y that is scheduled depending on network load experienced by, or expected for, the telecommunications network, access to the telecommunications network being granted to each terminal if the network load is below, or is expected to be below, a particular threshold.

17. A serving controller entity configured for use in a telecommunications network, wherein the telecommunications network is configured for providing access to a plurality of terminals, each terminal of the plurality comprising a unique identifier for accessing the telecommunications network,
wherein the serving controller entity is further configured to reduce network resource consumption by implementing an access operation,
and wherein the access operation is configured for denying network access a terminal of the plurality if access is requested outside of a grant access time interval,
wherein each terminal operates one or more machine-to-machine applications,
and wherein the grant access time interval for each terminal is a variable time interval x-y that is scheduled depending on network load experienced by, or expected for, the telecommunications network, access to the telecommunications network being granted to the each terminal if the network load is below, or is expected to be below, a particular threshold.

18. A telecommunications network configured for providing access to a plurality of terminals, each terminal of the plurality comprising a unique identifier for accessing the telecommunications network, wherein the telecommunications network comprises:
a register configured for storing the unique identifier of at least one terminal in combination with at least one access deny time interval, during which access to the telecommunications network for the at least one terminal is denied;
an access request receiver configured for receiving an access request and determining the unique identifier for accessing the telecommunications network from the at least one terminal;
a serving controller entity configured for reducing network resource consumption;
one or more processors; and
memory storing processor instructions that, when executed by the one or more processors, cause the one or more processors to carry out operations including:
an access operation for denying access to the telecommunications network for the at least one terminal if the access request is received within the access deny time interval,
wherein each terminal operates one or more machine-to-machine applications,
and wherein the access deny time interval for each terminal is a variable time interval x-y that is scheduled depending on network load experienced by, or expected for, the telecommunications network, access to the telecommunications network being denied to the each terminal if the network load is above, or is expected to be above, a particular threshold.

19. A computer-implemented method of controlling access to a telecommunications network, the telecommunications network being configured for allowing access for a plurality of terminals, each terminal of the plurality comprising a unique identifier for accessing the telecommunications network, the method comprising:
receiving an access request and the unique identifier from at least one terminal for access to said telecommunications network;
accessing a grant access time interval associated with the at least one terminal from a register of the telecommunications network using the received unique identifier, wherein the register is configured for storing the unique identifier of the at least one terminal in combination with the grant access time interval; and denying access to the telecommunications network for the at least one terminal if the access request is received outside the grant access time interval, wherein network resource consumption is reduced by carrying out denial of access to the telecommunications network at a level of a serving controller entity of the telecommunications network, wherein each terminal operates one or more machine-to-machine applications, and wherein the grant access time interval for each terminal is a variable time interval x-y that is scheduled depending on network load experienced by, or expected for, the telecommunications network, access to the telecommunications network being granted to the each terminal if the network load is below, or is expected to be below, a particular threshold.

20. The method of claim 19, wherein the serving controller entity of the telecommunications network is an SGSN.

21. The method of claim 19, wherein denying access to the telecommunications network for the at least one terminal is executed without authentication of the at least one terminal.

22. The method of claim 19, further comprising authorizing the at least one terminal in response to receiving the access request,
and wherein denial of access to the telecommunications network for the at least one terminal is executed upon receiving a further access request from the at least one terminal.

23. The method of claim 19, further comprising:
monitoring network load of the telecommunications network; and
adapting the grant access time interval based at least in part on the monitored network load.

24. The method of claim 23, wherein monitoring network load of the telecommunications network comprises one of (i) real-time monitoring, or (ii) monitoring based on an expected network load and using mathematical models and history data.

25. The method of claim 19, wherein a class of applications that do not require immediate transfer of data are denied access to the network during peak load hours by having grant access time intervals that are outside the peak load hours.

26. The method of claim 25, wherein the grant access time interval for a terminal executing the class of applications is adapted to be one of: (i) a predetermined time interval within an off-peak load interval, (ii) a time interval that corresponds to time slots during which access to the telecommunications network is denied.

27. The method claim 24, wherein the grant access time interval for a terminal executing the class of applications is one of one or more grant access time intervals assigned to a particular terminal or group of terminals.

28. The method of claim 19, wherein the telecommunications network comprises a cellular network, and the register is one of a home location register or a home subscriber server of the cellular telecommunications network.

29. The method claim 19, wherein denying access to the telecommunications network for the at least one terminal if the access request is received outside the grant access time interval comprises denying a network attach to the telecommunications network.

30. The method of claim 19, wherein:
receiving the access request comprises receiving the access request at the serving controller entity;
accessing a grant access time interval comprises retrieving the grant access time interval from the register to the serving controller entity in response to receiving the access request; and
denying access to the telecommunications network comprises one of (i) denying a network attach for the at least one terminal if the access request is received outside the retrieved grant access time interval, or (ii) denying establishing a packet data protocol context in the telecommunications network for the at least one terminal if the access request is received outside the retrieved grant access time interval.

31. The method of claim 30, further comprising transmitting access denial information to the at least one terminal, in addition to denying access to the telecommunications network.

32. The method of claim 30, further comprising authenticating the at least one terminal for access to a further network during the grant access time interval.

33. A computer-implemented method of controlling access to a telecommunications network, the telecommunications network being configured for allowing access for a plurality of terminals, each terminal of the plurality comprising a unique identifier for accessing the telecommunications network, the method comprising:
receiving an access request and the unique identifier from at least one terminal for access to said telecommunications network;
accessing an access deny time interval associated with the at least one terminal from a register of the telecommunications network using the received unique identifier, wherein the register is configured for storing the unique identifier of the at least one terminal in combination with the access deny time interval; and
denying access to the telecommunications network for at least one terminal if the access request is received within the access deny time interval, wherein network resource consumption is reduced by carrying out denial of access to the telecommunications network at a level of a serving controller entity of the telecommunications network,
wherein each terminal operates one or more machine-to-machine applications,
and wherein the access deny time interval for each terminal is a variable time interval x-y that is scheduled depending on network load experienced by, or expected for, the telecommunications network, access to the telecommunications network being denied to the each terminal if the network load is above, or is expected to be above, a particular threshold.

34. A non-transitory computer-readable medium having instructions stored thereon that, when executed by one or more processors of a telecommunications network configured for allowing access for a plurality of terminals that each comprise a unique identifier for accessing the telecommunications network, cause the telecommunications network to carry out functions including:
receiving an access request and the unique identifier from at least one terminal for access to said telecommunications network;
accessing a grant access time interval associated with the at least one terminal from a register of the telecommunications network using the received unique identifier, wherein the register is configured for storing the unique identifier of the at least one terminal in combination with the grant access time interval; and
denying access to the telecommunications network for the at least one terminal if the access request is received outside the grant access time interval, wherein network resource consumption is reduced by carrying out denial of access to the telecommunications network at a level of a serving controller entity of the telecommunications network,
wherein each terminal operates one or more machine-to-machine applications, and wherein the grant access time interval for each terminal is a variable time interval x-y that is scheduled depending on network load experienced by, or expected for, the telecommunications network, the access to the telecommunications network being granted to the each terminal if the network load is below, or is expected to be below, a particular threshold.

35. A non-transitory computer-readable medium having instructions stored thereon that, when executed by one or more processors of a telecommunications network configured for allowing access for a plurality of terminals that each comprise a unique identifier for accessing the telecommunications network, cause the telecommunications network to carry out functions including:
   receiving an access request and the unique identifier from at least one terminal for access to said telecommunications network;
   accessing a access deny time interval associated with the at least one terminal from a register of the telecommunications network using the received unique identifier, wherein the register is configured for storing the unique identifier of the at least one terminal in combination with the access deny time interval; and
   denying access to the telecommunications network for the at least one terminal if the access request is received within the access deny time interval, wherein network resource consumption is reduced by carrying out denial of access to the telecommunications network access at a level of a serving controller entity of the telecommunications network,
   wherein each terminal operates one or more machine-to-machine applications,
   and wherein the access deny time interval for each terminal is a variable time interval x-y that is scheduled depending on network load experienced by, or expected for, the telecommunications network, access to the telecommunications network being denied to the each terminal if the network load is above, or is expected to be above, a particular threshold.

36. A terminal configured for use in a telecommunications network, wherein the telecommunications network is configured for providing access to a plurality of terminals that each have a unique identifier for accessing the telecommunications network,
   and wherein the terminal comprises:
   a message receiver configured for receiving a message from the telecommunications network, the message including information indicative of a grant access time interval for the terminal retrieved from a register of the telecommunications network based on a unique identifier of the terminal retrieved from a register of the telecommuncations network based on a unique identifier of the terminal;
   one or more processors; and
   memory storing processor instructions that, when executed by the one or more processors, cause the one or more processors to carry out operations including:
   an access request operation for transmitting an access request to the telecommunications network in accordance with the grant access time interval in the message, and
   one or more machine-to-machine applications,
   wherein the grant access time interval is a variable time interval x-y that is scheduled depending on network load experienced by, or expected for, the telecommunications network, access to the telecommunications network being granted if the network load is below, or is expected to be below, a particular threshold.

37. A terminal configured for use in a telecommunications network, wherein the telecommunications network is configured for providing access to a plurality of terminals that each have a unique identifier for accessing the telecommunications network,
   and wherein the terminal comprises:
   a message receiver configured for receiving a message from the telecommunications network, the message including information indicative of an access deny time interval for the terminal retrieved from a register of the telecommunications network based on a unique identifier of the terminal retrieved from a register of the telecommuncations network based on a unique identifier of the terminal;
   one or more processors; and
   memory storing processor instructions that, when executed by the one or more processors, cause the one or more processors to carry out operations including:
   an access request operation for transmitting an access request to the telecommunications network in accordance with the access deny time interval in the message, and
   one or more machine-to-machine applications,
   wherein the access deny time interval for the terminal is a variable time interval x-y that is scheduled depending on network load experienced by, or expected for, the telecommunications network, access to the telecommunications network being denied if the network load is above, or is expected to be above, a particular threshold.

\* \* \* \* \*